US012282005B2

(12) United States Patent
Kim et al.

(10) Patent No.: US 12,282,005 B2
(45) Date of Patent: Apr. 22, 2025

(54) TECHNIQUE FOR TESTING THE BALL DENT PROPERTIES OF A SAMPLE

(71) Applicant: Ticona LLC, Florence, KY (US)

(72) Inventors: Young Shin Kim, Cincinnati, OH (US); Young Chul Yang, Seoul (KR); Soohee Choi, Seoul (KR)

(73) Assignee: Tiocona LLC, Florence, KY (US)

( * ) Notice: Subject to any disclaimer, the term of this patent is extended or adjusted under 35 U.S.C. 154(b) by 344 days.

(21) Appl. No.: 18/074,552

(22) Filed: Dec. 5, 2022

(65) Prior Publication Data

US 2023/0184649 A1     Jun. 15, 2023

Related U.S. Application Data

(60) Provisional application No. 63/288,685, filed on Dec. 13, 2021.

(51) Int. Cl.
 *G01N 3/303* (2006.01)
(52) U.S. Cl.
 CPC ..................... *G01N 3/303* (2013.01)
(58) Field of Classification Search
 CPC ....................................... G01N 3/303
 USPC ........................................ 73/12.06
 See application file for complete search history.

(56) References Cited

U.S. PATENT DOCUMENTS

| | | |
|---|---|---|
| 3,084,538 A | 4/1963 | Small et al. |
| 3,576,127 A * | 4/1971 | Weitzel ............... G01N 3/52 |
| | | 73/79 |
| 3,724,260 A * | 4/1973 | Bole .................. G01N 3/303 |
| | | 73/87 |
| 3,871,208 A * | 3/1975 | Berg .................. G01N 3/303 |
| | | 73/12.13 |
| 3,879,982 A | 4/1975 | Schmidt |
| 4,535,623 A | 8/1985 | Gilberto |
| 5,362,809 A | 11/1994 | Hallden-Abberton et al. |
| 5,492,946 A | 2/1996 | Huspeni et al. |
| 5,538,666 A | 7/1996 | Jin |
| 5,845,028 A | 12/1998 | Smith et al. |
| 5,891,132 A | 4/1999 | Hohla |
| 5,928,589 A | 7/1999 | Norota et al. |
| 6,046,300 A | 4/2000 | Umetsu et al. |
| 6,063,848 A | 5/2000 | Murakami et al. |

(Continued)

FOREIGN PATENT DOCUMENTS

| | | |
|---|---|---|
| CN | 202583021 U | 12/2012 |
| CN | 101497795 B | 2/2013 |

(Continued)

OTHER PUBLICATIONS

Product Information—Hardness Test Rod 318/318A/318C from Erichsen USA, retrieved from the Internet on Mar. 28, 2023, 2 pages.

(Continued)

*Primary Examiner* — Clayton E. LaBalle
*Assistant Examiner* — Warren K Fenwick
(74) *Attorney, Agent, or Firm* — Dority & Manning, P.A.

(57) ABSTRACT

A method for testing a sample for ball dent properties is provided. The method comprises disposing a sample on a stage of a testing apparatus and moving a trigger assembly that contains a tip having a radiused terminus toward the sample such that the terminus impacts the sample one or more times.

20 Claims, 3 Drawing Sheets

(56) References Cited

U.S. PATENT DOCUMENTS

| | | | |
|---|---|---|---|
| 6,153,121 A | 11/2000 | Makabe et al. | |
| 6,221,962 B1 | 4/2001 | Heino et al. | |
| 6,306,946 B1 | 10/2001 | Long et al. | |
| 6,461,732 B1 | 10/2002 | Wittmann et al. | |
| 6,495,616 B2 | 12/2002 | Maeda | |
| 6,680,002 B2 | 1/2004 | Yamauchi et al. | |
| 6,730,378 B2 | 5/2004 | Matsuoka et al. | |
| 6,733,691 B2 | 5/2004 | Nagano et al. | |
| 6,807,841 B1 * | 10/2004 | Chen | G01N 3/303 73/12.06 |
| 7,113,351 B2 | 9/2006 | Hovanky | |
| 7,166,238 B2 | 1/2007 | Kato et al. | |
| 7,189,778 B2 | 3/2007 | Tobita et al. | |
| 7,601,771 B2 | 10/2009 | Schmidt et al. | |
| 7,608,666 B2 | 10/2009 | Matsuoka et al. | |
| 7,612,130 B2 | 11/2009 | Kim | |
| 7,740,770 B2 | 6/2010 | Mizumoto et al. | |
| 7,776,410 B2 | 8/2010 | Nakane et al. | |
| 7,862,745 B2 | 1/2011 | Tano et al. | |
| 7,892,450 B2 | 2/2011 | Uchida et al. | |
| 7,960,473 B2 | 6/2011 | Kobayashi et al. | |
| 7,969,670 B2 | 6/2011 | Woo et al. | |
| 7,985,351 B2 | 7/2011 | Yamauchi et al. | |
| 8,066,907 B2 | 11/2011 | Kohinata et al. | |
| 8,086,099 B2 | 12/2011 | Schworm et al. | |
| 8,116,018 B2 | 2/2012 | Park et al. | |
| 8,142,683 B2 | 3/2012 | Murouchi et al. | |
| 8,192,645 B2 | 6/2012 | Murouchi et al. | |
| 8,202,448 B2 | 6/2012 | Fukuhara et al. | |
| 8,262,933 B2 | 9/2012 | Sekimura et al. | |
| 8,279,541 B2 | 10/2012 | Henderson et al. | |
| 8,324,307 B2 | 12/2012 | Harder et al. | |
| 8,432,484 B2 | 4/2013 | Christison | |
| 8,465,670 B2 | 6/2013 | Kondo et al. | |
| 8,545,719 B2 | 10/2013 | Komatsu et al. | |
| 8,641,924 B2 | 2/2014 | Sekimura et al. | |
| 8,646,994 B2 | 2/2014 | Kim et al. | |
| 8,658,057 B2 | 2/2014 | Nakayama et al. | |
| 8,696,932 B2 | 4/2014 | Uchida et al. | |
| 8,778,220 B2 | 7/2014 | Lee et al. | |
| 8,778,222 B2 | 7/2014 | Matsubara et al. | |
| 8,784,683 B2 | 7/2014 | Matsubara et al. | |
| 8,834,741 B2 | 9/2014 | Shiraishi et al. | |
| 8,906,259 B2 | 12/2014 | Kim | |
| 8,907,049 B2 | 12/2014 | Baidak et al. | |
| 8,926,862 B2 | 1/2015 | Kim et al. | |
| 8,932,483 B2 | 1/2015 | Kim | |
| 9,085,672 B2 | 7/2015 | Matsubara et al. | |
| 9,109,111 B2 | 8/2015 | Lee et al. | |
| 9,228,080 B2 | 1/2016 | Arpin | |
| 9,284,435 B2 | 3/2016 | Kim | |
| 9,355,753 B2 | 5/2016 | Kim | |
| 9,512,293 B2 | 12/2016 | Kim | |
| 9,641,732 B2 | 5/2017 | Yasukochi et al. | |
| 9,667,845 B2 | 5/2017 | Mirlay | |
| 9,822,254 B2 | 11/2017 | Kim | |
| 9,862,809 B2 | 1/2018 | Kim et al. | |
| 9,896,566 B2 | 2/2018 | Yung et al. | |
| 9,947,433 B2 | 4/2018 | Fujino et al. | |
| 9,988,519 B2 | 6/2018 | Kim | |
| 9,994,771 B2 | 6/2018 | Hegi | |
| 9,995,904 B2 | 6/2018 | Lee et al. | |
| 9,995,964 B2 | 6/2018 | Zhang et al. | |
| 10,106,682 B2 | 10/2018 | Kim | |
| 10,280,282 B2 | 5/2019 | Kim | |
| 10,287,421 B2 | 5/2019 | Kim | |
| 10,377,851 B2 | 8/2019 | Ishizu et al. | |
| 10,407,605 B2 | 9/2019 | Kim et al. | |
| 10,564,081 B2 | 2/2020 | Eversole et al. | |
| 10,633,538 B2 | 4/2020 | Stoppelmann | |
| 10,640,648 B2 | 5/2020 | Kim | |
| 10,654,970 B2 | 5/2020 | Matsubara et al. | |
| 10,767,049 B2 | 9/2020 | Kim | |
| 10,822,452 B2 | 11/2020 | Tsuchiya et al. | |
| 10,829,634 B2 | 11/2020 | Kim | |
| 10,941,275 B2 | 3/2021 | Kim | |
| 10,995,272 B2 | 5/2021 | Hara et al. | |
| 11,084,925 B2 | 8/2021 | Kim | |
| 11,086,200 B2 | 8/2021 | Kim | |
| 11,136,445 B2 | 10/2021 | Kim | |
| 11,174,342 B2 | 11/2021 | Hara et al. | |
| 11,208,556 B2 | 12/2021 | Kim | |
| 11,214,683 B2 | 1/2022 | Kim | |
| 11,294,141 B2 | 4/2022 | Kao et al. | |
| 11,485,851 B2 | 11/2022 | Hara | |
| 2002/0064701 A1 | 5/2002 | Hand et al. | |
| 2002/0172786 A1 | 11/2002 | Matsuoka et al. | |
| 2003/0096070 A1 | 5/2003 | Matsuoka et al. | |
| 2005/0077498 A1 | 4/2005 | Kato et al. | |
| 2005/0176835 A1 | 8/2005 | Kobayashi et al. | |
| 2005/0260361 A1 | 11/2005 | Alms et al. | |
| 2006/0009580 A1 | 1/2006 | Alms et al. | |
| 2006/0014876 A1 | 1/2006 | Bushelman et al. | |
| 2007/0057236 A1 | 3/2007 | Hosoda et al. | |
| 2007/0182059 A1 | 8/2007 | Ikegawa et al. | |
| 2007/0190346 A1 | 8/2007 | Ikegawa | |
| 2008/0048150 A1 | 2/2008 | Hosoda et al. | |
| 2011/0189454 A1 | 8/2011 | Fukuhara et al. | |
| 2011/0189455 A1 | 8/2011 | Fukuhara et al. | |
| 2012/0199790 A1 | 8/2012 | Yun et al. | |
| 2012/0218649 A1 | 8/2012 | Konishi et al. | |
| 2012/0232188 A1 | 9/2012 | Nakayama | |
| 2012/0251769 A1 | 10/2012 | Harada et al. | |
| 2012/0252955 A1 | 10/2012 | Sekmura et al. | |
| 2014/0316041 A1 | 10/2014 | Mehta | |
| 2015/0038631 A1 | 2/2015 | Hamaguchi et al. | |
| 2015/0104165 A1 | 4/2015 | Kim | |
| 2015/0112019 A1 | 4/2015 | Kim et al. | |
| 2015/0346390 A1 | 12/2015 | Nagura et al. | |
| 2018/0346641 A1 | 12/2018 | Hegi | |
| 2018/0346642 A1 | 12/2018 | Hegi | |
| 2020/0165444 A1 | 5/2020 | Tachikawa | |
| 2020/0172669 A1 | 6/2020 | Song et al. | |
| 2020/0247996 A1 | 8/2020 | Kim | |
| 2020/0304694 A1 | 9/2020 | Kim | |
| 2020/0347303 A1 | 11/2020 | Pan et al. | |
| 2020/0362099 A1 | 11/2020 | Hara et al. | |
| 2020/0399465 A1 | 12/2020 | Hara | |
| 2021/0061994 A1 | 3/2021 | Kim | |
| 2021/0189095 A1 | 6/2021 | Kim | |
| 2021/0341820 A1 | 11/2021 | Kim | |
| 2022/0025153 A1 | 1/2022 | Kim | |
| 2022/0098410 A1 | 3/2022 | Kim | |
| 2022/0112372 A1 | 4/2022 | Kim | |
| 2022/0243055 A1 | 8/2022 | Kim | |
| 2022/0266476 A1 | 8/2022 | Hara et al. | |

FOREIGN PATENT DOCUMENTS

| | | |
|---|---|---|
| CN | 102352259 B | 10/2013 |
| CN | 204332960 U | 5/2015 |
| CN | 104040422 B | 4/2016 |
| CN | 103360729 B | 5/2016 |
| CN | 106674938 A | 5/2017 |
| CN | 104341721 B | 7/2017 |
| CN | 104822775 B | 12/2017 |
| CN | 106380790 B | 1/2018 |
| CN | 105764988 B | 6/2018 |
| CN | 105907058 B | 6/2018 |
| CN | 105980479 B | 10/2018 |
| CN | 108350278 B | 7/2019 |
| CN | 108431138 B | 7/2019 |
| CN | 109790379 B | 4/2020 |
| CN | 111073224 A | 4/2020 |
| CN | 111087765 A | 5/2020 |
| CN | 111117170 A | 5/2020 |
| CN | 111138815 A | 5/2020 |
| CN | 109790378 B | 9/2020 |
| CN | 107924039 B | 10/2020 |
| CN | 111944278 A | 11/2020 |
| CN | 111989368 A | 11/2020 |
| EP | 2 774 952 B1 | 6/2019 |
| JP | 2000080289 A | 3/2000 |
| JP | 3111471 B2 | 11/2000 |

(56) References Cited

FOREIGN PATENT DOCUMENTS

| | | |
|---|---|---|
| JP | 2001026699 A | 1/2001 |
| JP | 3750232 B2 | 3/2006 |
| JP | 2007138143 A | 6/2007 |
| JP | 2007254716 A | 10/2007 |
| JP | 2007254717 A | 10/2007 |
| JP | 2009191088 A | 8/2009 |
| JP | 4600015 B2 | 12/2010 |
| JP | 4600016 B2 | 12/2010 |
| JP | 4625304 B2 | 2/2011 |
| JP | 4657565 B2 | 3/2011 |
| JP | 2011137064 A | 7/2011 |
| JP | 2012021147 A | 2/2012 |
| JP | 5088160 B2 | 12/2012 |
| JP | 5124932 B2 | 1/2013 |
| JP | 5132890 B2 | 1/2013 |
| JP | 5136324 B2 | 2/2013 |
| JP | 5256716 B2 | 8/2013 |
| JP | 5262138 B2 | 8/2013 |
| JP | 2013166848 A | 8/2013 |
| JP | 5396810 B2 | 1/2014 |
| JP | 5541330 B2 | 7/2014 |
| JP | 5742567 B2 | 7/2015 |
| JP | 2016124947 A | 7/2016 |
| JP | WO 2017/038421 A1 | 3/2017 |
| JP | 2017082158 A | 5/2017 |
| JP | WO 2017/110424 A1 | 6/2017 |
| JP | WO 2017/110646 A1 | 6/2017 |
| JP | 6164945 B2 | 7/2017 |
| JP | 6174406 B2 | 8/2017 |
| JP | 6190089 B1 | 8/2017 |
| JP | 2018012789 A | 1/2018 |
| JP | 6294690 B2 | 3/2018 |
| JP | 2018044108 A | 3/2018 |
| JP | WO 2018/066416 A1 | 4/2018 |
| JP | WO 2018/066417 A1 | 4/2018 |
| JP | WO 2018/074155 A1 | 4/2018 |
| JP | WO 2018/074156 A1 | 4/2018 |
| JP | 2018095683 A | 6/2018 |
| JP | 2018095684 A | 6/2018 |
| JP | 6359835 B2 | 7/2018 |
| JP | 2018106005 A | 7/2018 |
| JP | 6400690 B2 | 10/2018 |
| JP | 2018168207 A | 11/2018 |
| JP | 2019045607 A | 3/2019 |
| JP | WO 2019/054187 A1 | 3/2019 |
| JP | 6503272 B2 | 4/2019 |
| JP | 2019065263 A | 4/2019 |
| JP | WO 2019/065063 A1 | 4/2019 |
| JP | 6581659 B2 | 9/2019 |
| JP | WO 2019/203157 A1 | 10/2019 |
| JP | 2020029496 A | 2/2020 |
| JP | 2020029497 A | 2/2020 |
| JP | 2020164738 A | 10/2020 |
| JP | 6843675 B2 | 3/2021 |
| JP | 6844968 B2 | 3/2021 |
| JP | 2021038332 A | 3/2021 |
| JP | 2021059670 A | 4/2021 |
| JP | 6885687 B2 | 6/2021 |
| JP | 6892975 B1 | 6/2021 |
| JP | 2021098348 A | 7/2021 |
| KR | 20120059382 A | 6/2012 |
| KR | 20120136434 A | 12/2012 |
| KR | 20150011768 A | 2/2015 |
| KR | 101783505 B1 | 9/2017 |
| KR | 20200132709 A | 11/2020 |
| WO | WO 95/15360 A1 | 6/1995 |
| WO | WO 2013/129338 A1 | 9/2013 |
| WO | WO 2014/087842 A1 | 6/2014 |
| WO | WO 2015/083759 A1 | 6/2015 |
| WO | WO 2016/088714 A1 | 6/2016 |
| WO | WO 2017/023662 A1 | 2/2017 |
| WO | WO 2017/110866 A1 | 6/2017 |
| WO | WO 2017/110867 A1 | 6/2017 |
| WO | WO 2018/012371 A1 | 1/2018 |
| WO | WO 2020/071495 A1 | 4/2020 |

OTHER PUBLICATIONS

International Search Report and Written Opinion for PCT/US2022/051785 dated Mar. 21, 2023, 11 pages.
Certificate of Analysis of CR10-20 and SP60-05 from Nippon Steel Chemical & Material Co., Ltd. (Micron Div.), Aug. 19, 2019, 1 page.
Material Safety Data Sheet for Lotader® AX8840, Jul. 11, 2011, 8 pages.
Product Information—SPH507M from Nippon Steel Chemical & Material Co., Ltd., Micron Div., Jul. 29, 2020, 1 page.
Product Information for Kitamura PTFE Micropowder for Tribiology from Dreytek, Inc., 2 pages.
Product Information on Lotader® AX8840 from Arkema Functional Polyolefins, 2 pages.
Safety Data Sheet from Nippon Steel Chemical & Material Co., Ltd, Micron Div. for SPH507 (amorphous silica), Aug. 3, 2020, 7 pages.
Technical Data Sheet for XYDAR® CM-721 B from Solvay Specialty Polymers USA, LLC, 1 page.
Related Application Form.

\* cited by examiner

TECHNIQUE FOR TESTING THE BALL DENT PROPERTIES OF A SAMPLE

RELATED APPLICATION

The present application is based upon and claims priority to U.S. Provisional Patent Application Ser. No. 63/288,685, having a filing date of Dec. 13, 2021, which is incorporated herein by reference.

BACKGROUND OF THE INVENTION

Ball bearings are commonly utilized in actuator assemblies. For instance, camera modules in mobile phones, laptop computers, digital cameras, digital video cameras, etc., often include an actuator assembly for optical image stabilization (OIS) to reduce resolution loss or blurring caused by hand-shake. The actuator assembly functions by moving a lens module to a target position in response to a certain signal. To help ensure proper alignment of the lens module during movement, many actuator assemblies also include ball bearings that help guide the lens module in the desired direction. Ball bearings are generally formed of a strong material capable of withstanding forces exerted thereon by the relatively heavy components being moved. Other components of an actuator assembly are formed of different materials that may be impacted by interaction with the ball bearings, e.g., the lens module of a camera, housings, guide rods, etc. Unfortunately, ball bearings of an actuator assembly can cause damage, e.g., dents, on the surface of such other components. This damage can cause noise and impact performance as well as shorten the lifetime of the device. As such, a need exists for a technique for testing the performance characteristics of ball bearings used in actuator assemblies.

SUMMARY OF THE INVENTION

In accordance with one embodiment of the present invention, a ball dent testing apparatus is disclosed that comprises an actuator in communication with a trigger assembly. The trigger assembly comprises a tip including a first end defining a radiused terminus and an opposing second end. The tip further comprises a trigger rod extending from the second end of the tip to a trigger rod end.

In accordance with another embodiment of the present invention, a method for testing a sample for ball dent properties is disclosed that comprises disposing a sample on a stage of a testing apparatus and moving a trigger assembly that contains a tip having a radiused terminus towards the sample such that the terminus impacts the sample one or more times.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a technique for determining the ball dent characteristics of a sample so as to be better informed as to the long-term expectations of materials of interest for use in formation of devices, e.g., actuator assemblies. For instance, the device and method can be utilized in examination of materials of interest for use in forming actuator assemblies of lens modules in cameras, e.g., digital cameras and video cameras, including cameras found in combination devices, e.g., mobile phones, laptop computers, etc. More particularly, through the use of the technique of the present invention, the materials used in actuator assemblies can be evaluated prior to incorporation in the assembly.

Various embodiments of the present invention will now be described in more detail.

I. Testing Apparatus

Figure 1:
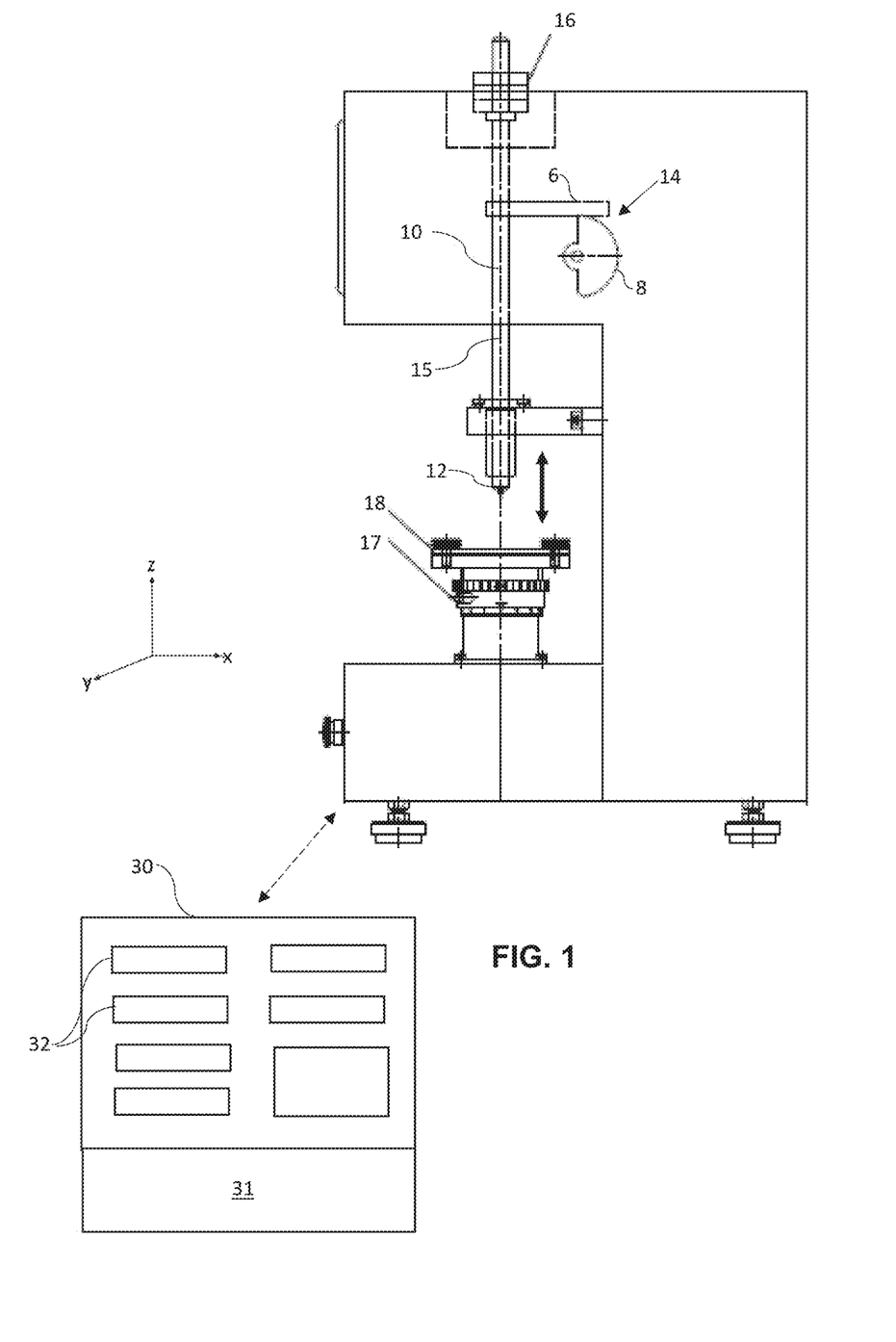
FIG. 1 illustrates one embodiment of a ball dent testing apparatus as described herein.

Referring to FIG. 1, an exemplary embodiment of a testing apparatus that can be employed in the present invention is illustrated. Briefly, the apparatus includes a trigger assembly 10 that includes a tip 12 at one end. The trigger assembly 10 is in communication with an actuator 14. The apparatus can also include a stage 18 that can retain a sample to be tested. During use, a control system can be used to control the actuator 14, thereby moving the trigger assembly 10 away from the stage 18 a predetermined distance and then causing the trigger assembly 10 to reverse direction to impact a sample carried on the stage 18 with the tip 12 as indicated by the bidirectional arrow. For instance, the actuator 14 can release the trigger assembly 10 upon which the trigger assembly 10 can drop under the force of gravity alone back toward the stage 18. A sample retained on the stage 18 can thus be repeatedly impacted by the tip 12 at a predetermined location on the surface as the trigger assembly 10 repeatedly falls toward the stage 18. The trigger assembly 10 can also include weights 16 that can be added or removed from the trigger assembly 10 so as to modify the impact force of the tip 12 on a sample.

Figure 2:
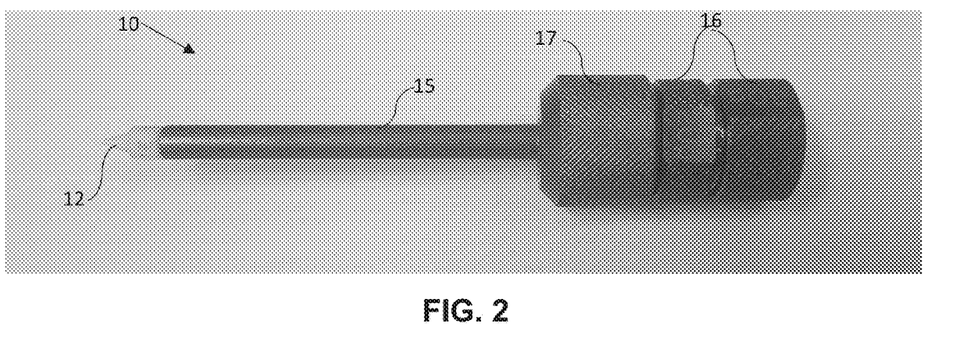
FIG. 2 illustrates one embodiment of a ball dent testing apparatus trigger assembly as described herein.
Figure 3:
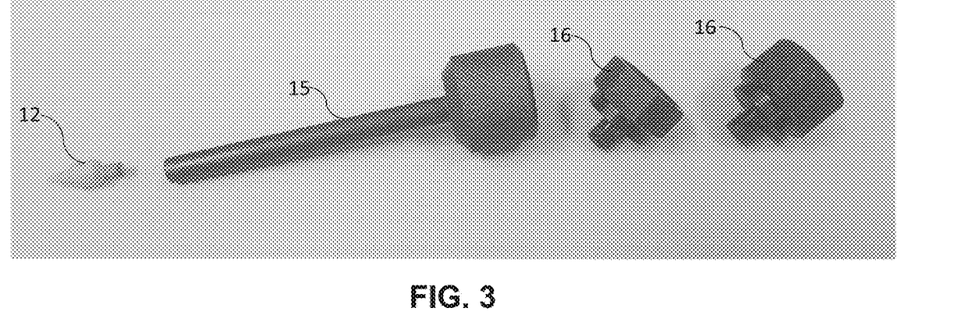
FIG. 3. illustrates the trigger assembly of FIG. 2 upon disassembly.
Figure 4:
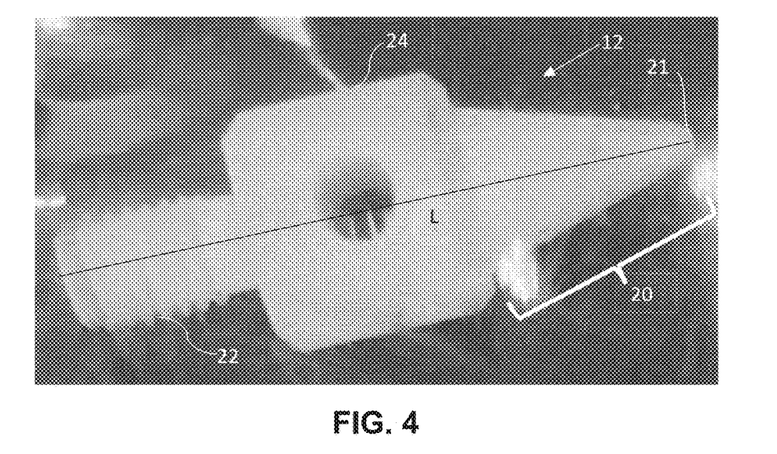
FIG. 4 illustrates the tip of the trigger assembly of FIGS. 2 and 3.

FIGS. 2-4 illustrate a trigger assembly 10 in both an assembled state (FIG. 2) and disassembled state (FIG. 3). As illustrated, the trigger assembly 10 can include a tip 12 that is designed to simulate a ball bearing. Namely, the tip 12 may include a radiused first end 21 at the termination of a head portion 20 that is formed of a material and having a curvature to mimic a ball bearing of interest, e.g., a ball bearing as may be incorporated in an actuator assembly. In some embodiments, a testing apparatus can be designed for simulating impacts of relatively small ball bearings, e.g., ball bearings having a diameter of about 1 millimeter or less. In such embodiments, the radiused end 21 of the tip 12 can define a certain radius of curvature, such as about 500 micrometers or less, in some embodiments from about 1 to about 400 micrometers, in some embodiments from about 2 to about 300 micrometers, and in some embodiments, from about 5 to about 200 micrometers. The radiused end 21 and/or the heard portion 20 of the tip 12 can be formed from the same or different material, such as a ceramic material (e.g., silicon nitride, titanium carbide, zirconia, silicon carbide, etc.), metals (e.g., steel, such as high carbon chromium steel, martensitic stainless steel, austenitic stainless steel), and so forth. In certain embodiments, a polymer composition such as described in more detail below may be employed in the tip 12 (e.g., radiused end 21). In such embodiments, it may be desired that the tip 12 contains a material of the same type of a material as the ball bearing to be simulated in a testing protocol.

The head portion 20 of the tip 12 can be of a size and shape to support the radiused end 21 that simulates a ball bearing during a testing protocol. For instance, the head portion 20 can be conical in shape, terminating at the radiused end 21 as illustrated in FIG. 4, or can have a different shape, e.g., pyramidal, triangular, cylindrical, etc. In some embodiments, the head portion 20 can expand in at least one dimension over the length of the head portion 20 to provide additional strength to the tip 12. For instance, the head portion 20 can be from about 2 millimeters to about 20 millimeters in length (from the radiused end 21 to a base of the head portion 20 as indicated by the line L) and can expand over that length from the diameter of the tip 12 to a width that can in some embodiments be from about twice the diameter of the radiused end 21 to about 5 times the diameter of the radiused end 21. The expansion can be gradual, as illustrated, or can be in distinct steps, each of which can independently include a taper across the length of the step or a constant cross section across the length of the step. As such, the head portion 20 can in some embodiments define a taper having an angle as measured by the interior angle of a triangle that overlays the tapered head portion of from about 5° to about 120°, in some embodiments from about 10° to about 90°, and in some embodiments, from about 20° to about 45°. Although by no means required, the head portion 20 may be unitary and of the same material as the tip 12.

In the illustrated embodiment of FIG. 4, the tip 12 includes a body portion 24 that is distinct from the head portion 20. In other embodiments, a distinct body portion 24 is not present, and the head portion that extends from the spherical tip can form the body of the tip 12. When included a body portion 24 can be of unitary construction and of the same material as head portion 20 or can be formed of a different material such as described above. When present, a distinct body portion 24 can differ in shape from the head portion 20. For example, the body portion 24 can have a larger cross sectional footprint as compared to the head portion 20. The overall shape of the body portion 24 can be, without limitation, cubic, cuboid, cylindrical, etc., and the body portion 24 can have any suitable cross-sectional shape (e.g., circular, square, triangular, pentagonal, hexagonal, etc.). The length of the body portion 24, when present, is not particularly limited and can be in some embodiments from about 2 millimeters to about 20 millimeters in length. Likewise, the maximum cross-sectional dimension of a body portion 24 is not particularly limited and can be in some embodiments from about 1 to about 50 millimeters, in some embodiments from about 2 to about 40 millimeters, and in some embodiments, from about 3 to about 20 millimeters.

Referring again to FIG. 2, an end of the tip 12 (opposing the first radiused terminus 21) can be disposed adjacent to an end of a trigger rod 15. In the illustrated embodiment, the tip 12 can be separable from the trigger rod 15 and as such, can include an attachment 22 (FIG. 4) for securing the tip 12 to the trigger rod 15. For instance, the attachment 22 can include mating threads on the exterior of the attachment 22 of the tip 12 and internal to an end of the trigger rod 15. Other types of attachments can include, without limitation, nuts/bolts, screws, snap fittings, push button snap fittings, threaded couplings, snap couplings, etc. In other embodiments, the tip 12 can be of unitary construction with the trigger rod 15, in which case a separable attachment need not be present. However, a separable tip 12 can be incorporated in some embodiments as this can provide a route for relatively facile modification of the apparatus to incorporate tips of various different sizes and/or materials. The trigger rod 15 can be formed of the same or a different material as the tip. In some embodiments, the trigger rod 15 can be formed of a steel. The length of the trigger rod 15 is not particularly limited, and can depend on the size of an apparatus, the location of the actuator of the apparatus, etc. As indicated in FIG. 1, the trigger rod 15 can be retained in communication with an actuator 14 so as to move the tip 12 toward and away from the stage 18. In some embodiments, the trigger rod 15 can have a length of from about 5 centimeters to about 20 centimeters, such as from about 6 centimeters to about 15 centimeters.

The trigger assembly 10 can also include one or more weights 16 that can be removably attached to the trigger rod 15, for instance by use of attachment types as described above for attachment of a tip 12 to a trigger rod 15. Such attachment mechanisms can be the same or different as those used for attachment of the tip 12. In the illustrated embodiment, the trigger rod 15 can include a collar 17 that can include a snap fitting, internal threads, etc. configured to mate with a weight 16. The presence and size of a collar 17 can generally depend upon the style of the weights 16 as well as the attachment mechanism used to attach the weights 16 to the trigger rod 17. In some embodiments, a collar 17 can have a larger cross sectional dimension, and can be used to help retain the trigger assembly within an apparatus. For instance, a collar 17 can have a height of from about 1 to about 50 millimeters, in some embodiments from about 2 to about 40 millimeters, and in some embodiments, from about 5 to about 30 millimeters, and can have a maximum cross-sectional dimension of from about 1 to about 80 millimeters, in some embodiments from about 2 to about 60 millimeters, and in some embodiments, from about 5 to about 40 millimeters.

As shown, the apparatus can include weights 16 that can be removably attached to one another, which can provide for a large number of modifications to the weight of the trigger assembly with a minimal number of weights 16. The weights can be formed of any suitable material, e.g., metals (steel, iron, etc.), polymers, etc. as well as combinations of materials as would be evident to one in the art and can be of any suitable weight, e.g., from milligrams to several grams each. The weights 16 can be of any suitable size and shape. For instance, in some embodiments, they can have a generally disc shape having roughly the same cross sectional shape and size as the collar 17 to which they can be attached. In some embodiments, the weights 16 can have a size similar to that of a collar 17, such as a height of from about 1 to about 50 millimeters, in some embodiments from about 2 to about 40 millimeters, and in some embodiments, from about 5 to about 30 millimeters, and can have a maximum cross-sectional dimension of from about 1 to about 80 millimeters, in some embodiments from about 2 to about 60 millimeters, and in some embodiments, from about 5 to about 40 millimeters.

As shown in FIG. 1, the trigger assembly 10 can be located within an apparatus in communication with an actuator 14 designed to provide reciprocal movement of the tip toward and away from the stage 18. As indicated, the actuator 14 can include a cam 8 in contact with a lever 6 that is connected to the trigger rod 15. As the cam 8 rotates, the lever 6 and attached trigger rod 15 will move the trigger assembly 10 away from the stage 18 a predetermined distance. Thereafter, the trigger assembly moves or is moved back to the stage to impact a sample held thereon with the tip 12. For instance, in some embodiments, the cam 8 can be non-spherical and at the apex of the motion distance, can separate from the lever, allowing the trigger assembly 10 to free fall back toward the stage 18 where the tip 12 impacts the sample at the spherical tip 21. Of course, other types of reciprocating actuators are also encompassed herein, including, without limitation hydraulic and pneumatic piston actuators that can actively move the trigger assembly toward the sample with a predetermined force at impact or allow free fall of the trigger assembly to provide impact under the force of gravity alone, as desired.

Generally speaking, the actuator 14 can be controlled by a control system (not shown). In one embodiment, the control system may include a computer or other suitable processing unit. Thus, the control system may include suitable computer-readable instructions that, when implemented, configure components of the apparatus to perform various different functions, such as actuating the trigger assembly 10, modifying the location of the stage 18 via a stage actuator 17, etc. The computer generally includes one or more processors and a memory. The processor(s) can be any known processing device. Memory stores information accessible by processor(s), including instructions that can be executed by processor(s). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits.

The memory device(s) of a control system may generally comprise memory element(s) including, but not limited to, computer readable medium (e.g., random access memory (RAM)), computer readable non-volatile medium (e.g., a flash memory), read only memory (ROM) on any medium, a magneto-optical disk (MOD), a digital versatile disc (DVD) and/or other suitable memory elements. The memory can be non-transitory. Such memory device(s) may generally be configured to store computer-readable instructions that, when implemented by the processor(s), configure the apparatus to perform various computer-implemented functions, such as facilitating the testing protocol described herein. The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits. Memory can also include data that may be retrieved, manipulated, or stored by processor(s). The computing device can also include a network interface for accessing information over a network. The network can include a combination of networks, such as Wi-Fi network, LAN, WAN, the Internet, cellular network, and/or other suitable network and can include any number of wired or wireless communication links. For instance, the computing device can communicate through a wired or wireless network with the actuator 14 and the stage 18.

The control system can be electronically linked to the actuator 14 to actuate the cam 8 in response to input instructions so as to move the trigger assembly 10 a predetermined distance from the sample and for a predetermined number of impact repetitions between the tip 12 of trigger assembly 10 and a sample retained on the stage 18. The control system can also be electronically linked to a stage actuator 17 to actuate the stage 18 in response to "x," "y," and "z" axis drive signals so as to move the stage in one or more of the x, y, and z planes as indicated on FIG. 1. As such, the stage 18 can be located as desired to contact a sample material retained thereon with the tip 12 of the trigger assembly 10 at a predetermined location during a testing protocol.

The memory device(s) associated with the control system may be configured to store data for execution and/or retrieval at a later time. For instance, memory device(s) can be configured to store instructions for protocols that can be executed by the processor(s) and carried out at a later time. For example, in certain embodiments, a plurality of different testing protocols may be carried out sequentially and data related to each protocol may be stored and retrieved at a later time.

The apparatus may also be communicatively coupled to a display device 30 (as indicated by the dashed bidirectional arrow) that can provide for input/output communication with the control system. For instance, the display device 30 can include a keyboard 31 or the like that can provide for instruction input such as impact numbers, impact rate, stage location, start time, etc. In addition, the display device 30 can include a variety of output readouts 32 that can show various characteristics of a testing protocol including, without limitation, current number of impacts during a protocol, total number of impacts to be carried out, force of impact on a testing material, weight of trigger assembly, run time, distance traveled by a trigger assembly in a single impact cycle, start/finish time of a test, stage location, etc. Other control inputs/outputs as may be incorporated on a display device can include, without limitation, power controls, mode selection (e.g., automatic/manual), start/stop control switches, etc.

To carry out a testing protocol, a sample can be retained on the stage 18, e.g., by use of an adhesive, clips, screws, or any other suitable retention device. While the size and shape of a material retained on the stage is not critical, in some embodiments, the material can be of a size and shape, e.g., thickness, similar to that of a product expected to incorporate the material. For example, in one embodiment, a sample can simulate a material for incorporation in an actuator assembly of a camera module that includes ball bearings.

The size of a sample is not particularly limited, as embodiments of the apparatus can include a movable stage so as to accommodate a sample of any desired thickness. By way of example, a sample can be from a few micrometers to several millimeters in thickness (i.e., in the z direction as indicated on FIG. 1 upon location on the stage 18), such as from about 50 micrometers to about 10 millimeters in thickness, from about 100 micrometers to about 5 millimeters in thickness, or from about 200 micrometers to about 2 millimeters in thickness in some embodiments.

Following assembly of a sample with an apparatus, a testing protocol can be carried out in which the sample is impacted with the tip 12 of the trigger apparatus 10 a number of times at a predetermined force. There is no particular limit on the number of times of impact or the impact force (e.g., drop distance and trigger assembly weight) of a testing protocol. For instance, the number of impacts of a testing protocol can be from a single impact to many thousands of impacts, e.g., from about 100 impacts to about 100,000 impacts, such as from about 500 impacts to about 50,000 impacts, or from about 1,000 impacts to about 25,000 impacts. Likewise, the weight of the trigger assembly (which in conjunction with the speed of the trigger assembly at impact determines the force of impact) can be the weight of the trigger assembly alone, e.g., a few grams, such as about 5 grams, or many hundreds of grams, such as up to about 200 grams. For instance, the weight added to a trigger assembly by use of one or more weights 16 can be from about 1 gram to about 100 grams, from about 5 grams to about 90 grams, from about 10 grams to about 80, or from about 20 grams to about 75 grams in some embodiments.

In those embodiments in which the trigger assembly is configured to free fall to impact the sample, the drop height of a trigger assembly is also not critical. For instance, a testing protocol can drop a trigger assembly a height of from a few hundred micrometers to several millimeters, such as from about 250 micrometers to about 5 millimeters, or from about 500 micrometers to about 2 millimeters in some embodiments.

Following a testing protocol, a sample can be examined to determine the depth of a dent formed by the tip 12 due to the multiple impacts on the sample surface.

II. Sample Material

A. Polymer Matrix

The sample to be tested using the technique of the present invention is generally formed from a polymer composition that includes a polymer matrix. The polymer matrix may contain one or more thermoplastic polymers. Typically, it is desired that such polymers have a high degree of heat resistance, such as reflected by a deflection temperature under load ("DTUL") of about 40° C. or more, in some embodiments about 50° C. or more, in some embodiments about 60° C. or more, in some embodiments from about from about 80° C. to about 250° C., and in some embodiments, from about 100° C. to about 200° C., as determined in accordance with ISO 75-2:2013 at a load of 1.8 MPa. In addition to exhibiting a high degree of heat resistance, the thermoplastic polymers also typically have a high glass transition temperature, such as about 10° C. or more, in some embodiments about 20° C. or more, in some embodiments about 30° C. or more, in some embodiments about 40° C. or more, in some embodiments about 50° C. or more, and in some embodiments, from about 60° C. to about 320° C. When semi-crystalline or crystalline polymers are employed, the high performance polymers may also have a high melting temperature, such as about 140° C. or more, in some embodiments from about 150° C. to about 400° C., and in some embodiments from about 200° C. to about 380° C. The glass transition and melting temperatures may be determined as is well known in the art using differential scanning calorimetry ("DSC"), such as determined by ISO 11357-2: 2020 (glass transition) and 11357-3:2018 (melting).

Suitable thermoplastic polymers for this purpose may include, for instance, polyolefins (e.g., ethylene polymers, propylene polymers, etc.), polyamides (e.g., aliphatic, semi-aromatic, or aromatic polyamides), polyesters, polyarylene sulfides, liquid crystalline polymers (e.g., wholly aromatic polyesters, polyesteramides, etc.), polycarbonates, polyethers (e.g., polyoxymethylene), etc., as well as blends thereof. The exact choice of the polymer system will depend upon a variety of factors, such as the nature of other fillers included within the composition, the manner in which the composition is formed and/or processed, and the specific requirements of the intended application.

Aromatic polymers, for instance, may be suitable in some applications. The aromatic polymers can be substantially amorphous, semi-crystalline, or crystalline in nature. One example of a suitable semi-crystalline aromatic polymer, for instance, is an aromatic polyester, which may be a condensation product of at least one diol (e.g., aliphatic and/or cycloaliphatic) with at least one aromatic dicarboxylic acid, such as those having from 4 to 20 carbon atoms, and in some embodiments, from 8 to 14 carbon atoms. Suitable diols may include, for instance, neopentyl glycol, cyclohexanedimethanol, 2,2-dimethyl-1,3-propane diol and aliphatic glycols of the formula $HO(CH_2)_nOH$ where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalene-dicarboxylic acids. Particular examples of such aromatic polyesters may include, for instance, poly(ethylene terephthalate) (PET), poly(1,4-butylene terephthalate) (PBT), poly(1,3-propylene terephthalate) (PPT), poly(1,4-butylene 2,6-naphthalate) (PBN), poly(ethylene 2,6-naphthalate) (PEN), poly (1,4-cyclohexylene dimethylene terephthalate) (PCT), as well as mixtures of the foregoing.

Derivatives and/or copolymers of aromatic polyesters (e.g., polyethylene terephthalate) may also be employed. For instance, in one embodiment, a modifying acid and/or diol may be used to form a derivative of such polymers. As used herein, the terms "modifying acid" and "modifying diol" are meant to define compounds that can form part of the acid and diol repeat units of a polyester, respectively, and which can modify a polyester to reduce its crystallinity or render the polyester amorphous. Examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4, 4-tetramethyl 1,3-cyclobutane diol, Z,8-bis (hydroxymethyltricyclo-[5.2.1.0]-decane wherein Z represents 3, 4, or 5; 1,4-bis(2-hydroxyethoxy)benzene, 4,4'-bis(2-hydroxyethoxy) diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g., diethylene glycol, triethylene glycol, dipropylene glycol, tripropylene glycol, etc. In general, these diols contain 2 to 18, and in some embodiments, 2 to 8 carbon atoms. Cycloaliphatic diols can be employed in their cis- or trans-configuration or as mixtures of both forms.

The aromatic polyesters, such as described above, typically have a DTUL value of from about 40° C. to about 80° C., in some embodiments from about 45° C. to about 75° C., and in some embodiments, from about 50° C. to about 70° C. as determined in accordance with ISO 75-2:2013 at a load of 1.8 MPa. The aromatic polyesters likewise typically have a glass transition temperature of from about 30° C. to about 120° C., in some embodiments from about 40° C. to about 110° C., and in some embodiments, from about 50° C. to about 100° C., such as determined by ISO 11357-2:2020, as well as a melting temperature of from about 170° C. to about 300° C., in some embodiments from about 190° C. to about 280° C., and in some embodiments, from about 210° C. to about 260° C., such as determined in accordance with ISO 11357-2:2018. The aromatic polyesters may also have an intrinsic viscosity of from about 0.1 dl/g to about 6 dl/g, in some embodiments from about 0.2 to about 5 dl/g, and in some embodiments from about 0.3 to about 1 dl/g, such as determined in accordance with ISO 1628-5:1998.

Polyarylene sulfides are also suitable semi-crystalline aromatic polymers. The polyarylene sulfide may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

and segments having the structure of formula:

or segments having the structure of formula:

The polyarylene sulfide may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

The polyarylene sulfides, such as described above, typically have a DTUL value of from about 70° C. to about 220° C., in some embodiments from about 90° C. to about 200° C., and in some embodiments, from about 120° C. to about 180° C. as determined in accordance with ISO 75-2:2013 at a load of 1.8 MPa. The polyarylene sulfides likewise typically have a glass transition temperature of from about 50° C. to about 120° C., in some embodiments from about 60° C. to about 115° C., and in some embodiments, from about 70° C. to about 110° C., such as determined by ISO 11357-2:2020, as well as a melting temperature of from about 220° C. to about 340° C., in some embodiments from about 240° C. to about 320° C., and in some embodiments, from about 260° C. to about 300° C., such as determined in accordance with ISO 11357-3:2018.

As indicated above, substantially amorphous polymers may also be employed that lack a distinct melting point temperature. Suitable amorphous polymers may include, for instance, aromatic polycarbonates, which typically contains repeating structural carbonate units of the formula —R$^1$—O—C(O)—O—. The polycarbonate is aromatic in that at least a portion (e.g., 60% or more) of the total number of R$^1$ groups contain aromatic moieties and the balance thereof are aliphatic, alicyclic, or aromatic. In one embodiment, for instance, R$^1$ may a C$_{6-30}$ aromatic group, that is, contains at least one aromatic moiety. Typically, R$^1$ is derived from a dihydroxy aromatic compound of the general formula HO—R$^1$—OH, such as those having the specific formula referenced below:

HO-A$^1$-Y$^1$-A$^2$-OH wherein,
A$^1$ and A$^2$ are independently a monocyclic divalent aromatic group; and
Y$^1$ is a single bond or a bridging group having one or more atoms that separate A$^1$ from A$^2$. In one particular embodiment, the dihydroxy aromatic compound may be derived from the following formula (I):

wherein,
R$^a$ and R$^b$ are each independently a halogen or C$_{1-12}$ alkyl group, such as a C$_{1-3}$ alkyl group (e.g., methyl) disposed meta to the hydroxy group on each arylene group;

p and q are each independently 0 to 4 (e.g., 1); and

X$^a$ represents a bridging group connecting the two hydroxy-substituted aromatic groups, where the bridging group and the hydroxy substituent of each C$_6$ arylene group are disposed ortho, meta, or para (specifically para) to each other on the C$_6$ arylene group.

In one embodiment, X$^a$ may be a substituted or unsubstituted C$_{3-18}$ cycloalkylidene, a C$_{1-25}$ alkylidene of formula —C(R$^c$)(R$^d$)— wherein R$^c$ and R$^d$ are each independently hydrogen, C$_{1-12}$ alkyl, C$_{1-12}$ cycloalkyl, C$_{7-12}$ arylalcyl, C$_{7-12}$ heteroalkyl, or cyclic C$_{7-12}$ heteroarylalkyl, or a group of the formula —C(=R$^e$)— wherein R$^e$ is a divalent C$_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein X$^a$ is a substituted cycloalkylidene is the cyclohexylidene-bridged, alkyl-substituted bisphenol of the following formula (II):

(II)

wherein,

R$^{a'}$ and R$^{b'}$ are each independently C$_{1-12}$ alkyl (e.g., C$_{1-4}$ alkyl, such as methyl), and may optionally be disposed meta to the cyclohexylidene bridging group;

R$^g$ is C$_{1-12}$ alkyl (e.g., C$_{1-4}$ alkyl) or halogen;

r and s are each independently 1 to 4 (e.g., 1); and t is 0 to 10, such as 0 to 5.

The cyclohexylidene-bridged bisphenol can be the reaction product of two moles of o-cresol with one mole of cyclohexanone. In another embodiment, the cyclohexylidene-bridged bisphenol can be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, X$^a$ may be a C$_{1-18}$ alkylene group, a C$_{3-13}$ cycloalkylene group, a fused C$_{6-13}$ cycloalkylene group, or a group of the formula —B$^1$—W—B$^2$—, wherein B$^1$ and B$^2$ are independently a C$_{1-6}$ alkylene group and W is a C$_{3-12}$ cycloalkylidene group or a C$_{6-16}$ arylene group.

X$^a$ may also be a substituted C$_{3-13}$ cycloalkylidene of the following formula (III):

(III)

wherein,

R$^r$, R$^p$, R$^q$, and R$^t$ are each independently hydrogen, halogen, oxygen, or C$_{1-12}$ organic groups;

I is a direct bond, a carbon, or a divalent oxygen, sulfur, or —N(Z)—, wherein Z is hydrogen, halogen, hydroxy, C$_{1-12}$ alkyl, C$_{1-12}$ alkoxy, or C$_{1-12}$ acyl;

h is 0 to 2;

j is 1 or 2;

i is 0 or 1; and k is 0 to 3, with the proviso that at least two of R$^r$, R$^p$, R$^q$, and R$^t$ taken together are a fused cycloaliphatic, aromatic, or heteroaromatic ring.

Other useful aromatic dihydroxy aromatic compounds include those having the following formula (IV):

(IV)

wherein,

R$^h$ is independently a halogen atom (e.g., bromine), C$_{1-10}$ hydrocarbyl (e.g., C$_{1-10}$ alkyl group), a halogen-substituted C$_{1-10}$ alkyl group, a C$_{6-10}$ aryl group, or a halogen-substituted C$_{6-10}$ aryl group;

n is 0 to 4.

Specific examples of bisphenol compounds of formula (I) include, for instance, 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). In one specific embodiment, the polycarbonate may be a linear homopolymer derived from bisphenol A, in which each of A$^1$ and A$^2$ is p-phenylene and Y$^1$ is isopropylidene in formula (I).

Other examples of suitable aromatic dihydroxy compounds may include, but not limited to, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2- bis(5-phenoxy-4-hydroxyphenyl)ethylene 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, etc., as well as combinations thereof.

Aromatic polycarbonates, such as described above, typically have a DTUL value of from about 80° C. to about 300° C., in some embodiments from about 100° C. to about 250° C., and in some embodiments, from about 140° C. to about 220° C., as determined in accordance with ISO 75-2:2013 at a load of 1.8 MPa. The glass transition temperature may also be from about 50° C. to about 250° C., in some embodiments from about 90° C. to about 220° C., and in some embodiments, from about 100° C. to about 200° C., such as determined by ISO 11357-2:2020. Such polycarbonates may also have an intrinsic viscosity of from about 0.1 dl/g to about 6 dl/g, in some embodiments from about 0.2 to about 5 dl/g, and in some embodiments from about 0.3 to about 1 dl/g, such as determined in accordance with ISO 1628-4: 1998.

In addition to the polymers referenced above, highly crystalline aromatic polymers may also be employed in the polymer composition. Particularly suitable examples of such polymers are liquid crystalline polymers, which have a high degree of crystallinity that enables them to effectively fill the small spaces of a mold. The liquid crystalline polymers are generally classified as "thermotropic" to the extent that they can possess a rod-like structure and exhibit a crystalline behavior in their molten state (e.g., thermotropic nematic state). The polymers have a relatively high melting temperature, such as from about 280° C. to about 400° C., in some embodiments from about 290° C. to about 390° C., and in some embodiments, from about 300° C. to about 380° C. Such polymers may be formed from one or more types of repeating units as is known in the art. A liquid crystalline polymer may, for example, contain one or more aromatic ester repeating units generally represented by the following Formula (I):

(I)

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and
$Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 50 mol. % or more, in some embodiments about 60 mol. % or more, and in some embodiments, from about 80 mol. % to 100 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 1 mol. % to about 50 mol. %, in some embodiments from about 2 mol. % to about 40 mol. %, and in some embodiments, from about 5 mol. % to about 30% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Typically, the liquid crystalline polymer is a "high naphthenic" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically about 10 mol. % or more, in some embodiments about 15 mol. % or more, and in some embodiments, from about 20 mol. % to about 35 mol. % of the polymer. Contrary to many conventional "low naphthenic" polymers, it is believed that the resulting "high naphthenic" polymers are capable of exhibiting good thermal and mechanical properties. In one particular embodiment, for instance, the liquid crystalline polymer may be formed from repeating units derived from 4-hydroxybenzoic acid ("HBA") and 6-hydroxy-2-naphthoic acid ("HNA"), as well as various other optional constituents. The repeating units derived from 4-hydroxybenzoic acid ("HBA") may constitute from about 50 mol. % to about 90 mol. %, in some embodiments from about 60 mol. % to about 85 mol. %, and in some embodiments, from about 65 mol. % to about 80 mol. % of the polymer. The repeating units derived from 6-hydroxy-2-naphthoic acid ("HNA") may likewise constitute from about 10 mol. % to about 50 mol. %, in some embodiments from about 15 mol. % to about 40 mol. %, and in some embodiments, from about 20 mol. % to about 35% of the polymer.

Of course, besides aromatic polymers, aliphatic polymers may also be suitable for use as high performance, thermoplastic polymers in the polymer matrix. In one embodiment, for instance, polyamides may be employed that generally have a CO—NH linkage in the main chain and are obtained by condensation of an aliphatic diamine and an aliphatic dicarboxylic acid, by ring opening polymerization of lactam, or self-condensation of an amino carboxylic acid. For example, the polyamide may contain aliphatic repeating units derived from an aliphatic diamine, which typically has from 4 to 14 carbon atoms. Examples of such diamines include linear aliphatic alkylenediamines, such as 1,4-tetramethylenediamine, 1,6-hexanediamine, 1,7-heptanediamine, 1,8-octanediamine, 1,9-nonanediamine, 1,10-decanediamine, 1,11-undecanediamine, 1,12-dodecanediamine, etc.; branched aliphatic alkylenediamines, such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, etc.; as well as combinations thereof. Aliphatic dicarboxylic acids may include, for instance, adipic acid, sebacic acid, etc. Particular examples of such aliphatic polyamides include, for instance, nylon-4 (poly-α-pyrrolidone), nylon-6 (polycaproamide), nylon-11 (polyundecanamide), nylon-12 (polydodecanamide), nylon-46 (polytetramethylene adipamide), nylon-66 (polyhexamethylene adipamide), nylon-610, and nylon-612. Nylon-6 and nylon-66 are particularly suitable.

It should be understood that it is also possible to include aromatic monomer units in the polyamide such that it is considered aromatic (contains only aromatic monomer units are both aliphatic and aromatic monomer units). Examples of aromatic dicarboxylic acids may include, for instance, terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, etc. Particularly suitable aromatic polyamides may include poly(nonamethylene terephthalamide) (PA9T), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA10T/11), poly (decamethylene terephthalamide/12-aminododecanamide) (PA10T/12), poly(decamethylene terephthalamide/decamethylene decanediamide) (PA10T/1010), poly(decamethylene terephthalamide/decamethylene dodecanediamide) (PA10T/1012), poly(decamethylene terephlhalamide/tetramethylene hexanediamide) (PA10T/46), poly(decamethylene terephthalamide/caprolactam) (PA10T/6), poly(decamethylene terephthalamide/hexamethylene hexanediamide) (PA10T/66), poly(dodecamethylene lerephthalamide/dodecamelhylene dodecanediamide) (PA12T/1212), poly(dodecamethylene terephthalamide/caprolactam) (PA12T/6), poly(dodecamethylene terephthalamide/hexamethylene hexanediamide) (PA12T/66), and so forth.

Suitable polyamides for the polymer matrix are typically crystalline or semi-crystalline in nature and thus has a measurable melting temperature. The melting temperature may be relatively high such that the composition can provide a substantial degree of heat resistance to a resulting part. For example, the polyamide may have a melting temperature of about 220° C. or more, in some embodiments from about 240° C. to about 325° C., and in some embodiments, from about 250° C. to about 335° C. The polyamide may also have a relatively high glass transition temperature, such as about 30° C. or more, in some embodiments about 40° C. or more, and in some embodiments, from about 45° C. to about 140° C. The glass transition and melting temperatures may be determined as is well known in the art using differential scanning calorimetry ("DSC"), such as determined by ISO Test No. 11357-2:2020 (glass transition) and 11357-3:2018 (melting).

Propylene polymers may also be suitable aliphatic high performance polymers for use in the polymer matrix. Any of a variety of propylene polymers or combinations of propylene polymers may generally be employed in the polymer matrix, such as propylene homopolymers (e.g., syndiotactic, atactic, isotactic, etc.), propylene copolymers, and so forth. In one embodiment, for instance, a propylene polymer may be employed that is an isotactic or syndiotactic homopolymer. The term "syndiotactic" generally refers to a tacticity in which a substantial portion, if not all, of the methyl groups alternate on opposite sides along the polymer chain. On the other hand, the term "isotactic" generally refers to a tacticity in which a substantial portion, if not all, of the methyl groups are on the same side along the polymer chain. In yet other embodiments, a copolymer of propylene with an α-olefin monomer may be employed. Specific examples of suitable α-olefin monomers may include ethylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. The propylene content of such copolymers may be from about 60 mol. % to about 99 mol. %, in some embodiments from about 80 mol. % to about 98.5 mol. %, and in some embodiments, from about 87 mol. % to about 97.5 mol. %. The α-olefin content may likewise range from about 1 mol. % to about 40 mol. %, in some embodiments from about 1.5 mol. % to about 15 mol. %, and in some embodiments, from about 2.5 mol. % to about 13 mol. %.

Suitable propylene polymers are typically those having a DTUL value of from about 80° C. to about 250° C., in some embodiments from about 100° C. to about 220° C., and in some embodiments, from about 110° C. to about 200° C., as determined in accordance with ISO 75-2:2013 at a load of 1.8 MPa. The glass transition temperature of such polymers may likewise be from about 10° C. to about 80° C., in some embodiments from about 15° C. to about 70° C., and in some embodiments, from about 20° C. to about 60° C., such as determined by ISO 11357-2:2020. Further, the melting temperature of such polymers may be from about 50° C. to about 250° C., in some embodiments from about 90° C. to about 220° C., and in some embodiments, from about 100° C. to about 200° C., such as determined by ISO 11357-3:2018.

Oxymethylene polymers may also be suitable aliphatic high performance polymers for use in the polymer matrix. Oxymethylene polymers can be either one or more homopolymers, copolymers, or a mixture thereof. Homopolymers are prepared by polymerizing formaldehyde or formaldehyde equivalents, such as cyclic oligomers of formaldehyde. Copolymers can contain one or more comonomers generally used in preparing polyoxymethylene compositions. Commonly used comonomers include alkylene oxides of 2-12 carbon atoms. If a copolymer is selected, the quantity of comonomer will typically not be more than 20 weight percent, in some embodiments not more than 15 weight percent, and, in some embodiments, about two weight percent. Comonomers can include ethylene oxide and butylene oxide. It is preferred that the homo- and copolymers are: 1) those whose terminal hydroxy groups are end-capped by a chemical reaction to form ester or ether groups; or, 2) copolymers that are not completely end-capped, but that have some free hydroxy ends from the comonomer unit. Typical end groups, in either case, are acetate and methoxy.

B. Optional Components

In some cases, one or more other optional components may be employed in the polymer composition. In such embodiments, the polymer matrix typically constitutes from about 20 wt. % to about 90 wt. %, in some embodiments from about 25 wt. % to about 80 wt. %, and in some embodiments, from about 30 wt. % to about 70 wt. % of the polymer composition, and the optional components likewise typically constitute about 10 wt. % to about 80 wt. %, in some embodiments from about 20 wt. % to about 75 wt. %, and in some embodiments, from about 30 wt. % to about 70 wt. % of the polymer composition.

In one embodiment, for instance, the polymer composition may contain inorganic filler particles that are distributed within the polymer matrix. Such particles typically constitute from about 60 to about 300 parts by weight, in some embodiments from about 80 to about 250 parts by weight, in some embodiments from about 90 to about 225 parts by weight, and in some embodiments, from about 100 to about 200 parts by weight per 100 parts by weight of the polymer matrix. The inorganic filler particles may, for instance, constitute from about 30 wt. % to about 70 wt. %, in some embodiments from about 35 wt. % to about 65 wt. %, and in some embodiments, from about 40 wt. % to about 60 wt. % of the polymer composition. In certain embodiments, the particles may be formed from a natural and/or synthetic mineral, such as talc, mica, halloysite, kaolinite, illite, montmorillonite, vermiculite, palygorskite, pyrophyllite, calcium silicate, aluminum silicate, wollastonite, etc. Talc is particularly suitable for use in the polymer composition. Other suitable inorganic filler particles may include, for instance, silica, alumina, calcium carbonate, etc.

The particles may possess a variety of different forms and shapes depending upon the desired result. For instance, the particles may be in the shape of a sphere, crystal, rod, disk, tube, string, etc. In one embodiment, for example, the particles may be generally spherical in that the aspect ratio (ratio of the median diameter to the thickness) is from about 0.7 to about 1.3, in some embodiments from about 0.8 to about 1.2, in some embodiments from about 0.9 to about 1.1 (e.g., 1). Regardless of their particular shape, however, the particles are generally selectively controlled to have a certain a median (D50) diameter, such as about 4 micrometers or less, in some embodiments from about 0.01 to about 3 micrometers, in some embodiments from about 0.05 to about 2 micrometers, and in some embodiments, from about 0.1 to about 1.5 micrometers, such as determined by a laser diffraction particle size analyzer (e.g., Mastersizer 3000). The particles may also have a narrow size distribution. That is, at least about 70% by volume of the particles, in some embodiments at least about 80% by volume of the particles, and in some embodiments, at least about 90% by volume of the particles may have a size within the ranges noted above. Furthermore, within the general size ranges noted above, it may sometimes be desirable to employ a blend of particles having different sizes to achieve the target properties. For example, fine particles may be employed in combination with coarse particles having a larger median diameter than the fine particles. The fine particles may, for instance, have a median diameter of about 1.5 micrometers or less, in some embodiments from about 0.1 to about 1.2 micrometers, and in some embodiments, from about 0.2 to about 1 micrometer, while the coarse particles may have a median diameter of about 1.5 micrometers to about 4 micrometers, in some embodiments from about 1.8 to about 3.5 micrometers, and in some embodiments, from about 2 to about 3 micrometers.

The particles may also have a controlled specific surface area, such as from about 1 to about 50 square meters per gram ($m^2/g$), in some embodiments from about 2 to about 20 $m^2/g$, and in some embodiments, from about 4 to about 12 $m^2/g$. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas.

In one particular embodiment, silica particles may be employed. The silica particles may be formed using a variety of different processes, such as a fumed process, precipitation, etc. Due to their higher surface area and smaller particle size, fumed particles may be particularly suitable. Fumed silica, for instance, is amorphous $SiO_2$ that can be produced by vapor phase hydrolysis of silicon tetrachloride in a hydrogen oxygen flame. Three-dimensional branched chain aggregates are produced in the flame from fusion of the primary particles. During cooling, these aggregates agglomerate into a fine powder having a particle size within the ranges noted above. Fumed silica possesses silanol groups that can react under acidic conditions to form a cross-linked network. The resulting siloxane cross-linkage is a compound of silicon and oxygen in which each atom of silicon is bonded to four oxygen atoms, forming a tetrahedral structure, in a manner analogous to the bonding of carbon to hydrogen in methane, the bonds being of about the same strength in each case. This structure is found in the dioxide and in silicates generally, where the $SiO_4$ groups occur in chains or rings. By creating siloxane cross-linkages, a gel is formed that entraps the liquid phase of the electrolyte.

Various other types of additives may also be employed in the polymer composition. In one embodiment, for instance, mineral fibers (or "whiskers") may be employed, such as those that are derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are fibers having the desired hardness value, including fibers derived from inosilicates, such as wollastonite (Mohs hardness of 4.5 to 5.0), which are commercially available from Nyco Minerals under the trade designation Nyglos® (e.g., Nyglos® 4 W or Nyglos® 8). The mineral fibers may have a median width (e.g., diameter) of from about 1 to about 35 micrometers, in some embodiments from about 2 to about 20 micrometers, in some embodiments from about 3 to about 15 micrometers, and in some embodiments, from about 7 to about 12 micrometers. In addition to possessing the size characteristics noted above, the mineral fibers may also have a relatively high aspect ratio (average length divided by median width) to help further improve the mechanical properties and surface quality of the resulting polymer composition. For example, the mineral fibers may have an aspect ratio of from about 2 to about 100, in some embodiments from about 2 to about 50, in some embodiments from about 3 to about 20, and in some embodiments from about 4 to about 15. The volume average length of such mineral fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

Impact modifiers may also be employed, such as polymers that contain an olefinic monomeric unit that derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The olefin polymer may be in the form of a copolymer that contains other monomeric units as known in the art. For example, another suitable monomer may include a "(meth)acrylic" monomer, which includes acrylic and methacrylic monomers, as well as salts or esters thereof, such as acrylate and methacrylate monomers. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one embodiment, for instance, the impact modifier may be an ethylene methacrylic acid copolymer ("EMAC"). When employed, the relative portion of the monomeric component(s) may be selectively controlled. The α-olefin monomer(s) may, for instance, constitute from about 55 wt. % to about 95 wt. %, in some embodiments from about 60 wt. % to about 90 wt. %, and in some embodiments, from about 65 wt. % to about 85 wt. % of the copolymer. Other monomeric components (e.g., (meth)acrylic monomers) may constitute from about 5 wt. % to about 35 wt. %, in some embodiments from about 10 wt. % to about 32 wt. %, and in some embodiments, from about 15 wt. % to about 30 wt. % of the copolymer.

Other suitable olefin copolymers may be those that are "epoxy-functionalized" in that they contain, on average, two or more epoxy functional groups per molecule. The copolymer may also contain an epoxy-functional monomeric unit. One example of such a unit is an epoxy-functional (meth)acrylic monomeric component. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethylacrylate, and glycidyl itoconate. Other suitable monomers may also be employed to help achieve the desired molecular weight. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate). When employed, the epoxy-functional (meth)acrylic monomer(s) typically constitutes from about 1 wt. % to about 20 wt. %, in some embodiments from about 2 wt. % to about 15 wt. %, and in some embodiments, from about 3 wt. % to about 10 wt. % of the copolymer.

A wide variety of additional additives can also be included in the polymer composition, such as lubricants, thermally conductive fillers, pigments, antioxidants, stabilizers, surfactants, waxes, flame retardants, anti-drip additives, nucleating agents (e.g., boron nitride), fibrous fillers (e.g., glass fibers) anti-static agents, tribological compounds, and other materials added to enhance properties and processability. Lubricants, for example, may be employed in the polymer composition that are capable of withstanding the processing conditions of the polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth, hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

Regardless of the components employed, they may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

The polymer composition may exhibit certain beneficial properties that enables its use in a ball bearing. For example, when subjected to the test as described herein, the polymer composition may exhibit a dent of only about 15 micrometers or less, in some embodiments about 12 micrometers or less, in some embodiments from about 1 to about 10 micrometers, and in some embodiments, from about 2 to about 11 micrometers, such as determined by dropping a tip as described herein 4,000 times from a height of 1 mm with an added weight of 20 grams or 20,000 times from a height of 0.5 mm with an added weight of 70 grams.

The polymer composition may also exhibit excellent mechanical properties. For example, the composition may exhibit a Charpy unnotched impact strength of about 10 kJ/m$^2$, in some embodiments from about 15 to about 60 kJ/m$^2$, and in some embodiments, from about 20 to about 50 kJ/m$^2$, measured at 23° C. according to ISO Test No. 179-1:2010. The composition may also exhibit a tensile strength of from about 150 to about 500 MPa, in some embodiments from about 160 to about 400 MPa, and in some embodiments, from about 170 to about 350 MPa; tensile break strain of about 0.5% or more, in some embodiments from about 0.8% to about 15%, and in some embodiments, from about 1% to about 10%; and/or tensile modulus of about 11,000 MPa or more, in some embodiments from about 12,000 MPa to about 30,000 MPa, in some embodiments from about 13,000 MPa to about 25,000 MPa, and in some embodiments, from about 14,000 MPa to about 22,000 MPa, such as determined in accordance with ISO Test No. 527:2019 at 23° C. The tensile properties may be determined in accordance with ISO Test No. 527:2019 at 23° C. The polymer composition may also exhibit a flexural modulus of about 11,000 MPa or more, in some embodiments from about 12,000 MPa to about 30,000 MPa, and in some embodiments, from about 13,000 MPa to about 25,000 MPa; a flexural strength of from about 40 to about 500 MPa, in some embodiments from about 100 to about 400 MPa, and in some embodiments, from about 150 to about 350 MPa; and/or a flexural break strain of about 0.5% or more, in some embodiments from about 1% to about 15%, and in some embodiments, from about 2% to about 10%, such as determined in accordance with ISO Test No. 178:2019 at 23° C. The composition may also exhibit a Charpy unnotched impact strength of about 45 kJ/m$^2$ or more, in some embodiments from about 45 to about 100 kJ/m$^2$, and in some embodiments, from about 50 to about 80 kJ/m$^2$, measured at 23° C. according to ISO Test No. 179-1:2010. Further, the deflection temperature under load (DTUL) of about 180° C. or more, and in some embodiments, from about 190° C. to about 280° C., as measured according to ASTM D648-18 at a specified load of 1.8 MPa.

The polymer composition may also exhibit a Rockwell surface hardness of about 65 or less, in some embodiments about 60 or less, and in some embodiments, from about 40 to about 55, as determined in accordance with ASTM D785-08 (2015) (Scale M). Further, the polymer composition may also have a melt viscosity of about 200 Pa-s or less, in some embodiments about 150 Pa-s or less, in some embodiments from about 10 to about 100 Pa-s, and in some embodiments, from about 20 to about 90 Pa-s, determined at a shear rate of 400 seconds$^{-1}$. Melt viscosity may be determined in accordance with ISO Test No. 11443:2014 at a temperature that is 15° C. higher than the melting temperature of the composition (e.g., about 305° C.).

III. Product Applications

Once tested in accordance with the present invention, the sample may be employed in a wide variety of potential product applications, such as in camera modules, lighting devices, etc. In one embodiment, for example, the sample may be employed in a camera module that includes a housing which a lens module is positioned that contains one or more lenses. However, the particular configuration of the camera module may vary as is known to those skilled in the art.

Figure 5:
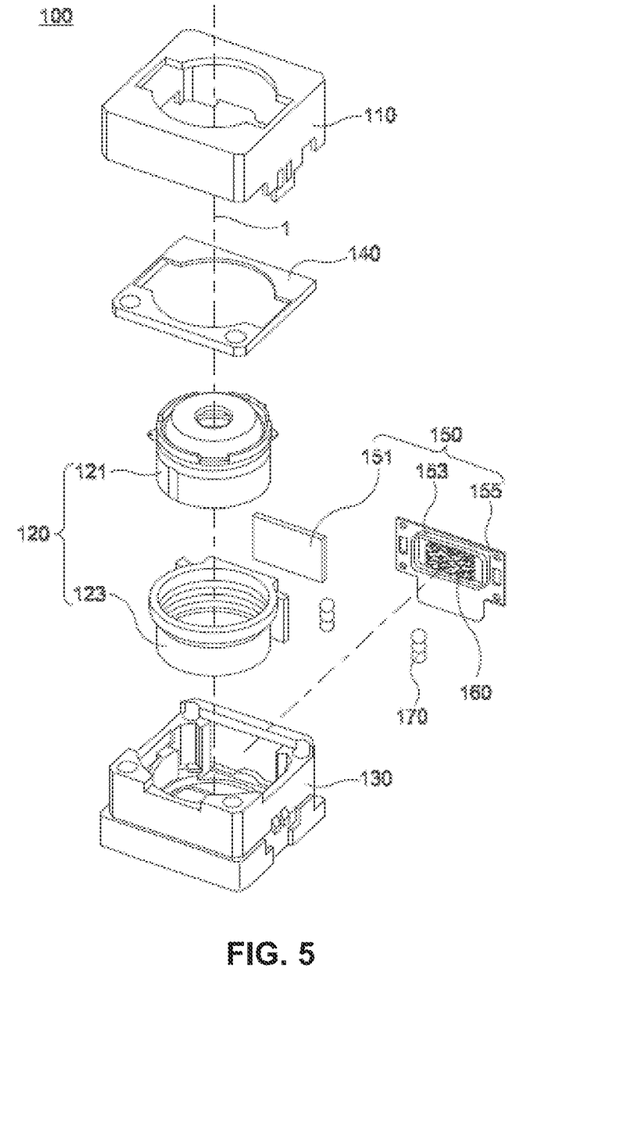
FIG. 5 illustrates one embodiment of a camera module including components formed of materials as may be tested according to disclosed embodiments.

Referring to FIG. 5, for example, one embodiment of a camera module 100 is shown that contains a lens module 120 that is contained within a housing, wherein the lens module 120 contains a lens barrel 121 coupled to a lens holder 123. The lens barrel 121 may have a hollow cylindrical shape so that a plurality of lenses for imaging an object may be accommodated therein in an optical axis direction 1. The lens barrel 121 may be inserted into a hollow cavity provided in the lens holder 123, and the lens barrel 121 and the lens holder 123 may be coupled to each other by a fastener (e.g., screw), adhesive, etc. The lens module 120, including the lens barrel 121, may be moveable in in the optical axis direction 1 (e.g., for auto-focusing) by an actuator assembly 150. In the illustrated embodiment, for example, the actuator assembly 150 may include a magnetic body 151 and a coil 153 configured to move the lens module 120 in the optical axis direction 1. The magnetic body 151 may be mounted on one side of the lens holder 123, and the coil 153 may be disposed to face the magnetic body 151. The coil 153 may be mounted on a substrate 155, which is in turn may be mounted to the housing 130 so that the coil 153 faces the magnetic body 151. The actuator assembly 150 may include a drive device 160 that is mounted on the substrate 155 and that outputs a signal (e.g., current) for driving the actuator assembly 150 depending on a control input signal. The actuator assembly 150 may receive the signal and generate a driving force that moves the lens module 120 in the optical axis direction 1. If desired, a stopper 140 may also be mounted on the housing 130 to limit a moving distance of the lens module 120 in the optical axis direction 1. Further, a shield case 110 (e.g., metal) may also be coupled to the housing 130 to enclose outer surfaces of the housing 130, and thus block electromagnetic waves generated during driving of the camera module 100.

The actuator assembly may also include a guide unit that is positioned between the housing and the lens module to help guide the movement of the lens module. Any of a variety of guide units may be employed as known in the art, such as spring(s), ball bearing(s), electrostatic force generators, hydraulic force generators, etc. For example, springs can be employed that generate a preload force that acts on the lens module and guides it into the desired optical axis direction. Alternatively, as illustrated in the embodiment shown in FIG. 1, ball bearings 170 may act as a guide unit of the actuator assembly 150. More specifically, the ball bearings 170 may contact an outer surface of the lens holder 123 and an inner surface of the housing 130 to guide the movement of the lens module 120 in the optical axis direction 1. That is, the ball bearings 170 may be disposed between the lens holder 123 and the housing 130, and may guide the movement of the lens module 120 in the optical axis direction through a rolling motion. Any number of ball bearings 170 may generally be employed for this purpose, such as 2 or more, in some embodiments from 3 to 20, and in some embodiments, from 4 to 12. The ball bearings 170 may be spaced part or in contact with each other, and may also be stacked in a direction perpendicular to the optical axis direction 1. The size of the ball bearings 170 may vary as is known to those skilled in the art. For instance, the ball bearings may have an average size (e.g., diameter) of about 800 micrometers or less, in some embodiments about 600 micrometers or less, in some embodiments about 400 micrometers or less, and in some embodiments, from about 50 to about 200 micrometers.

Notably, a sample tested in accordance with the present invention may be employed in any of a variety of parts of the camera module. Referring again to FIG. 5, for instance, the tested sample may be used to form all or a portion of the guide unit (e.g., ball bearings 170), housing 130, lens barrel 121, lens holder 123, substrate 155, stopper 140, shield case 110, and/or any other portion of the camera module. Regardless, the desired part(s) may be formed using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which a polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

The resulting camera module may be used in a wide variety of electronic devices as is known in the art, such as in portable electronic devices (e.g., mobile phones, portable computers, tablets, watches, etc.), computers, televisions, automotive parts, etc. In one particular embodiment, the polymer composition may be employed in a camera module, such as those commonly employed in wireless communication devices (e.g., cellular telephone).

The following test methods may be employed to determine the properties referenced above.

TEST METHODS

Melt Viscosity:

The melt viscosity (Pa-s) may be determined in accordance with ISO Test No. 11443:2014 at a shear rate of 1,000 s$^{-1}$ and temperature 15° C. above the melting temperature using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature:

The melting temperature ("Tm") may be determined by differential scanning calorimetry ("DSC") as is known in the art. The melting temperature is the differential scanning calorimetry (DSC) peak melt temperature as determined by ISO Test No. 11357-2:2020. Under the DSC procedure, samples were heated and cooled at 20° C. per minute as stated in ISO Standard 10350 using DSC measurements conducted on a TA Q2000 Instrument.

Deflection Temperature Under Load ("DTUL"):

The deflection under load temperature may be determined in accordance with ISO Test No. 75-2:2013 (technically equivalent to ASTM D648-18). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation:

Tensile properties may be tested according to ISO Test No. 527:2019 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Elongation:

Flexural properties may be tested according to ISO Test No. 178:2019 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Charpy Impact Strength:

Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Rockwell Hardness:

Rockwell hardness is a measure of the indentation resistance of a material and may be determined in accordance with ASTM D785-08 (Scale M). Testing is performed by first forcing a steel ball indentor into the surface of a material using a specified minor load. The load is then increased to a specified major load and decreased back to the original minor load. The Rockwell hardness is a measure of the net increase in depth of the indentor, and is calculated by subtracting the penetration divided by the scale division from 130.

The present invention may be better understood with reference to the following examples.

EXAMPLES 1-7

A device as illustrated in FIG. 1 was assembled. The trigger assembly included a tip formed of a ceramic material. The tip defined a radiused end hemisphere having a diameter of 835 micrometers. The head portion was conical in shape having a length of 5,985 micrometers from the distal end of the spherical end to the base of the head portion where the head portion met the body portion. At this juncture, the head portion had a diameter of 3,981 micrometers. The body portion of the tip was cylindrical in shape having a length of 6,062 micrometers. The tip also included a threaded attachment as illustrated. The complete length of the tip from the spherical end to the terminus of the attachment was 17 millimeters. The tip was threaded into the end of a trigger rod that was 82 millimeters in length, including an 18 millimeter long collar at which a weight could be attached via a threaded junction. Samples were retained on the stage. The samples were formed of various different liquid crystal polymer compositions as noted below, each having a thickness of 0.23 millimeters. Protocols were run with either 20 grams or 70 grams weight added to the trigger assembly. The drop height of the trigger assembly was set to either 1.0 millimeter or 0.5 millimeter. The number of impacts was either 4,000 impacts or 20,000 impacts. The average depth of the dents formed in the sample (micrometers) is shown in the table below.

| Conditions | Ex. 1 | Ex. 2 | Ex. 3 | Ex. 4 | Ex. 5 | Ex. 6 | Ex. 7 |
| --- | --- | --- | --- | --- | --- | --- | --- |
| 1 mm, 20 g, 4,000x | 10.7 | 9.1 | 8.5 | 6.4 | 5.8 | 5.0 | 5.6 |
| 0.5 mm, 70 g, 20,000x | 25.3 | 10.6 | 7.9 | 5.5 | 4.8 | 5.0 | 6.3 |
| Filler Type | Mica | Amorphous Silica/ Wollastonite Fibers | Amorphous Silica/ Wollastonite Fibers | Amorphous Silica | Amorphous Silica | Amorphous Silica | Amorphous Silica |
| Filler Wt. % | 25 | 30 | 30 | 30 | 20 | 20 | 20 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A ball dent testing apparatus comprising an actuator in communication with a trigger assembly, wherein the trigger assembly comprises a tip including a first end defining a radiused terminus and an opposing second end, and wherein the tip further comprises a trigger rod extending from the second end of the tip to a trigger rod end.

2. The ball dent testing apparatus of claim 1, wherein the apparatus further comprises one or more weights that are removably attachable to the trigger rod end.

3. The ball dent testing apparatus of claim 1, wherein the radiused terminus defines a radius of curvature of about 5 millimeters or less.

4. The ball dent testing apparatus of claim 1, wherein the radiused terminus defines a radius of curvature of about 500 micrometers or less.

5. The ball dent testing apparatus of claim 1, wherein the radiused terminus comprises a metal, ceramic, glass, polymer composition, or a combination thereof.

6. The ball dent testing apparatus of any of claim 1, wherein the tip comprises a head portion extending from the radiused terminus.

7. The ball dent testing apparatus of claim 6, wherein the head portion has a conical shape.

8. The ball dent testing apparatus of claim 6, further comprising a body portion extending from the head portion.

9. The ball dent testing apparatus of claim 1, wherein the tip is removably attachable to the trigger rod.

10. The ball dent testing apparatus of claim 1, wherein a control system is configured to instigate motion of the trigger assembly by the actuator.

11. The ball dent testing apparatus of claim 1, wherein the actuator is configured to move the trigger assembly a predetermined distance away from a stage.

12. The ball dent testing apparatus of claim 11, wherein the actuator is further configured to release the trigger assembly following the movement, thereby releasing the trigger assembly.

13. The ball dent testing apparatus of claim 1, further comprising a stage actuator configured to move the stage in one or more directions.

14. A method for testing a sample for ball dent properties, the method comprising disposing a sample on a stage of a testing apparatus and moving a trigger assembly that contains a tip having a radiused terminus toward the sample such that the terminus impacts the sample one or more times.

15. The method of claim 14, further comprising inspecting the surface of the sample following the impact to determine a characteristic of any indentation in the surface caused by the impact.

16. The method of claim 14, wherein the motion of the trigger assembly toward the stage is instigated by release of the trigger assembly such that the trigger assembly free falls under the force of gravity alone toward the stage.

17. The method of claim 14, further comprising removably attaching one or more weights to the trigger assembly.

18. The method of claim 14, wherein the tip impacts the sample multiple times.

19. The method of claim 14, wherein the sample comprises a polymer composition.

20. The method of claim 19, wherein the polymer composition comprises a polymer matrix that includes a thermotropic liquid crystalline polymer.

* * * * *